United States Patent
Yadav et al.

(10) Patent No.: US 11,811,870 B1
(45) Date of Patent: Nov. 7, 2023

(54) METHODS AND SYSTEMS FOR DYNAMICALLY ADJUSTING DATA CHUNK SIZES COPIED OVER A NETWORK

(71) Applicant: Dell Products L.P., Round Rock, TX (US)

(72) Inventors: Sunil Yadav, Bangalore (IN); Shelesh Chopra, Bangalore (IN); Aaditya Bansal, Bangalore (IN); Manish Sharma, Bangalore (IN)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 17/724,660

(22) Filed: Apr. 20, 2022

(51) Int. Cl.
*H04L 67/1095* (2022.01)
*H04L 47/765* (2022.01)
*H04L 47/628* (2022.01)

(52) U.S. Cl.
CPC ........ *H04L 67/1095* (2013.01); *H04L 47/628* (2013.01); *H04L 47/765* (2013.01)

(58) Field of Classification Search
CPC .. H04L 67/1095; H04L 47/628; H04L 47/765
See application file for complete search history.

(56) References Cited

U.S. PATENT DOCUMENTS

| 9,268,783 | B1 * | 2/2016 | Shilane | H03M 7/3091 |
| 10,620,871 | B1 * | 4/2020 | Mukku | H04L 67/1097 |
| 2006/0107087 | A1 * | 5/2006 | Sieroka | G06F 9/45558 714/4.1 |
| 2006/0167922 | A1 * | 7/2006 | Poyourow | G06F 16/2219 707/999.102 |
| 2022/0095310 | A1 * | 3/2022 | Li | H04L 5/0058 |

* cited by examiner

*Primary Examiner* — Sm A Rahman
(74) *Attorney, Agent, or Firm* — Chamberlain, Hrdlicka, White, Williams, & Aughtry

(57) ABSTRACT

A method for copying source data from a source server to a destination server, that includes initiating, by a source copy manager, a copy operation of the source data, where during the copy operation, the method further includes obtaining resource statistics, setting a data chunk size based on the resource statistics, copying a data chunk to a read queue, where the data chunk includes a portion of the source data, and where the data chunk has the data chunk size, and sending, from the read queue, the data chunk to a network device, and ending the copy operation.

17 Claims, 3 Drawing Sheets

METHODS AND SYSTEMS FOR DYNAMICALLY ADJUSTING DATA CHUNK SIZES COPIED OVER A NETWORK

BACKGROUND

Devices and/or components of devices are often capable of performing certain functionalities that other devices and/or components are not configured to perform and/or are not capable of performing. In such scenarios, it may be desirable to adapt one or more systems to enhance the functionalities of devices and/or components that cannot perform the one or more functionalities.

DETAILED DESCRIPTION

Figure 1:
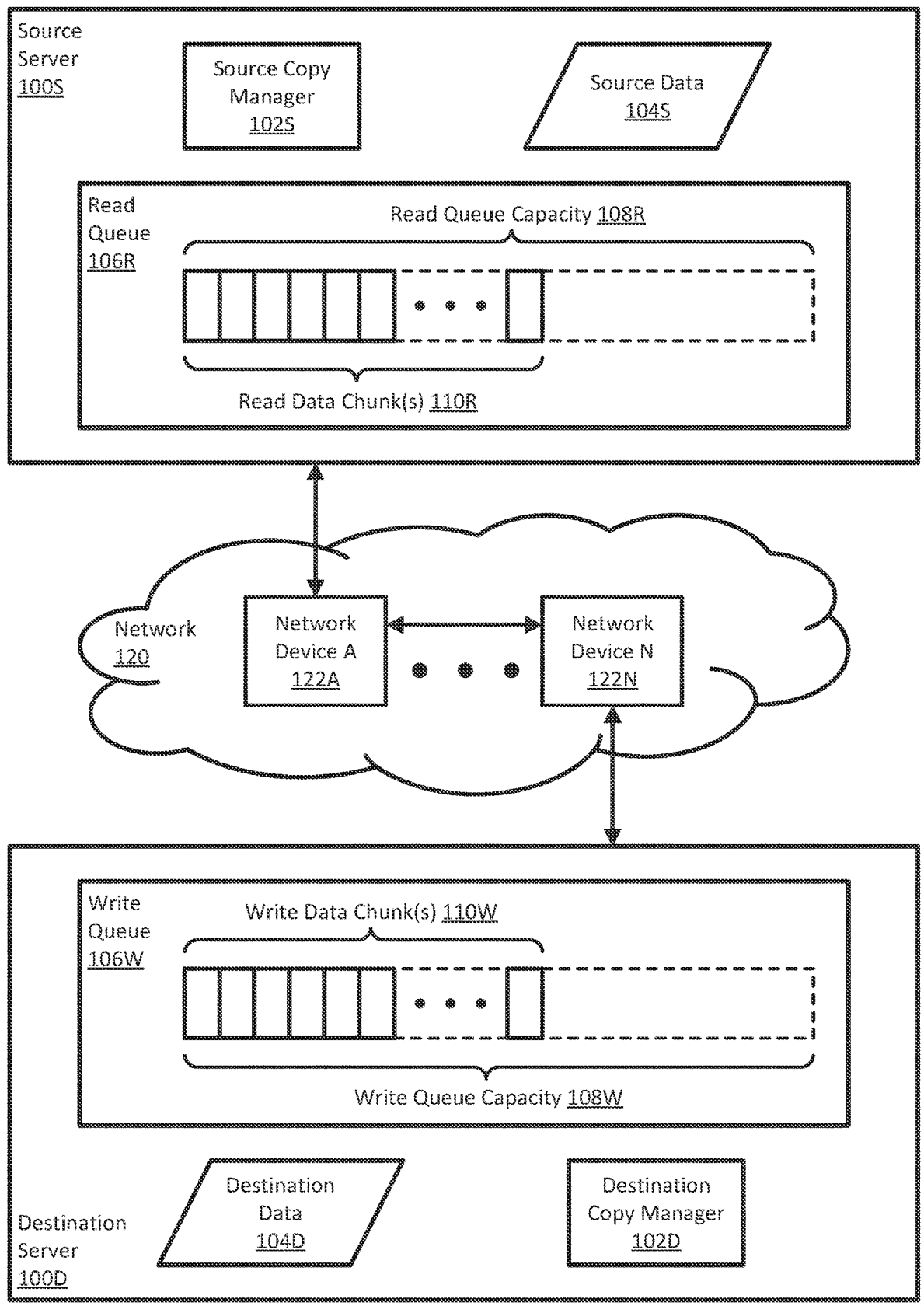
FIG. 1 shows a diagram of system, in accordance with one or more embodiments of the invention.

In general, embodiments of the invention relate to systems and methods for dynamically adjusting the data chunk size of source data read from a source server and sent over a network to a destination server (i.e., a copy operation). In conventional systems, a chunk size may be chosen based on some set of criteria and remain constant (i.e., fixed) throughout the copy operation. In such conventional scenarios, a data chunk size that is too small may result in under-utilization of the system resources and cause the copy operation to take longer than if a comparatively larger data chunk size was used. However, if the data chunks are sized are too large, the source server and/or destination server may utilize one or more system resource(s) to their capacity (e.g., full memory, entire processor, etc.) causing the server(s) to throttle and slow down. Accordingly, a compromise is made, and a fixed data chunk size is chosen that avoids the perils of being too small or too large. However, this compromised data chunk size is not necessarily the most optimal for the system—a data chunk size that is larger or smaller may better utilize the servers' resources and complete the copy operation more quickly.

Accordingly, as discussed herein, one or more embodiments of the invention provide methods and systems for dynamically adjusting the data chunk size throughout and during the copy operation. To do this, a "copy manager" may be executing on the source server (i.e., the server hosting the source data to be sent) and periodically perform an analysis on one or more relevant statistics to determine if the data chunk size should be increased or decreased.

Specifically, as discussed further herein, data chunk sizes may have three types of size limits, (1) "hard" limits, at which the data chunks will fail to be sent by the source server, transmitted by one or more network device(s), and/or received by the destination server, (2) "soft" limits at which performance may suffer for the source server, one or more network device(s), and/or the destination server—causing slower transfer speeds than would be possible with a different data chunk size, and (3) "use case" limits that may be implemented to avoid decreased performance of concurrent source server operations (or may allow for some tolerable performance reduction of concurrent source server operations).

A non-limiting example of "hard" limit includes data chunk sizes that are too large to be transmitted by one or more network device(s). That is, one or more network devices may not be able to handle the data chunk within a single packet (due to the maximum transmission unit (MTU)), further the read queue of the source server may fill with large data chunks (consuming memory) while the network processes the data chunk at a slower rate not providing sufficient opportunity for the source server to clear the read queue. As another non-limiting example, if data chunk sizes are too small, the process of sending the data may take longer than permissible, possibly not finishing before the next copy operation is scheduled to begin. In such a scenario, the source server would be in a perpetual copy operation and always behind schedule.

Non-limiting examples of a "soft" limit include, as discussed above, a data chunk size that is too small may result in under-utilization of the system resources and cause the copy operation to take longer, and data chunks that are too large may cause the source server and/or destination server to utilize one or more system resource(s) to their capacity (e.g., full memory, entire processor, etc.) causing the server(s) to throttle and slow down.

As an additional non-limiting example of "soft" limits, there may be an imbalance between the reader queue of the source server and the writer queue of the destination server. In such a scenario, the data chunk size may be too small for the read queue or write queue, causing one of the two queues to be empty for periods of the copy operation (e.g., under-utilizing the resources of that server).

Lastly, as a non-limiting example of a "use case" limit, a user may be actively using the source server by executing software and/or performing one or more operation(s) thereon. In order to avoid interfering with the user's activity (or interfering too much), the source copy manager may throttle the copy operation based on the central processing unit (CPU) and/or memory usage of the source server in order to leave sufficient resources available to the user.

Specific embodiments will now be described with reference to the accompanying figures. In the following description, numerous details are set forth as examples of the invention. One of ordinary skill in the art, having the benefit of this detailed description, would appreciate that one or more embodiments of the present invention may be practiced without these specific details and that numerous variations or modifications may be possible without departing from the scope of the invention. Certain details, known to those of ordinary skill in the art, may be omitted to avoid obscuring the description.

In the following description of the figures, any component described with regard to a figure, in various embodiments of the invention, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments of the invention, any description of any component of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the term 'operatively connected', or 'operative connection', means that there exists between elements/components/devices a direct or indirect connection that allows the elements to interact with one another in some way (e.g., via the exchange of information). For example, the phrase 'operatively connected' may refer to any direct (e.g., wired connection or wireless connection directly between two devices) or indirect (e.g., wired and/or wireless connections between any number of devices connecting the operatively connected devices) connection.

As used herein, the adjectives "source", "destination", and "intermediate" are for explanatory purposes only. That is, the components, devices, and collections of devices described using these adjectives are meant only to provide a better understanding to the reader in the context of a particular scenario—not to generally limit the capabilities of those components, devices, and collections of devices. As an example, a "component" may perform certain operation when acting as a "source component" and may perform some of the same and other operations when acting as a "destination component". However, each "component" (whether it be "source" or "destination") may be fully capable of performing the operations of either role.

As used herein, the word "data" is treated as an "uncountable" singular noun—not as the plural form of the singular noun "datum". Accordingly, throughout the application, "data" is paired with a singular verb when written (e.g., "data is"). However, this usage should not be interpreted to redefine "data" to exclusively mean a single bit of information. Rather, as used herein, "data" means any one or more bit(s) of information that are logically and/or physically grouped. Further, "data" may be used as a plural noun if context provides the existence of multiple "data" (e.g., "two data are combined").

FIG. 1 shows a diagram of system, in accordance with one or more embodiments of the invention. The system may include one or more server(s) (e.g., source server (100S), destination server (100D)) and network (e.g., network (120)) connecting two or more server(s) (100). Each of these components is described below.

In one or more embodiments, a computing device is hardware that includes one or more processor(s), memory (volatile and/or non-volatile), persistent storage, internal physical interface(s) (e.g., serial advanced technology attachment (SATA) ports, peripheral component interconnect (PCI) ports, M.2 ports, etc.), external physical interface(s) (e.g., universal serial bus (USB) ports, recommended standard (RS) serial ports, audio/visual ports, etc.), communication interface(s) (e.g., network ports, small form-factor pluggable (SFP) ports, wireless network devices, etc.), input and output device(s) (e.g., human interface devices), or any combination thereof. Further, in one or more embodiments, the persistent storage (and/or memory) of the computing device may store computer instructions (e.g., computer code) which, when executed by the processor(s) of the computing device (e.g., as software), cause the computing device to perform one or more processes specified in the computer instructions. Non-limiting examples of a computing device include a network device (e.g., switch, router, multi-layer switch, etc.), a server (e.g., a blade-server in a blade-server chassis, a rack server in a rack, etc.), a personal computer (e.g., desktop, laptop, tablet, smart phone, personal digital assistant), and/or any other type of computing device with the aforementioned capabilities.

In one or more embodiments of the invention, a network (120) is a collection of connected network devices (e.g., network device A (122A), network device N (122N)) that allow for the communication of data from one network device to other network devices and/or servers (100), or the sharing of resources among network devices. Examples of a network (e.g., network (120)) include, but are not limited to, a local area network (LAN), a wide area network (WAN) (e.g., the Internet), a mobile network, or any other type of network that allows for the communication of data and sharing of resources among network devices and/or devices operatively connected to the network (120). One of ordinary skill in the art, having the benefit of this detailed description, would appreciate that a network is a collection of operatively connected devices that enables communication between those devices.

In one or more embodiments of the invention, a network device (e.g., network device A (122A), network device N (122N)) is a computing device. Non-limiting examples of a network device (122) include a switch, router, multi-layer switch, and a server.

In one or more embodiments of the invention, a server (e.g., source server (100S), destination server (100D)) is a computing device. A server (100) may include one or more forms of data (e.g., source data (104S), destination data (104D)), a copy manager (e.g., source copy manager (102S), destination copy manager (102D)), one or more types of queues (e.g., a read queue (106R), a write queue (106W)).

In one or more embodiments of the invention, copy manager (e.g., source copy manager (102S), destination copy manager (102D)) is software, executing on a server (100), that is configured to generate (i.e., create, write), maintain, and/or otherwise modify destination data (104D) from source data (104S). A copy manager (102) may receive commands and/or requests (e.g., from a user, from another copy manager), and in response to receiving those requests, generate destination data (104D). A copy manager may perform some or all of the method shown in FIG. 2.

In one or more embodiments of the invention, data (e.g., source data (104S), destination data (104D)) is digital information stored on a computing device (i.e., in a storage device and/or in memory). In one or more embodiments of the invention, data (104) may include one or more individual data components (e.g., blocks, files, records, chunks, etc.) that may be separately read, copied, erased, and/or otherwise modified. One of ordinary skill in the art, having the benefit of this detailed description, would appreciate what data is and how data is used on computing devices. In one or more embodiments of the invention, source data (104S) is data that is stored on a storage device (i.e., memory and/or non-volatile storage) of the source server (100S). Source data (104S) may be data that is originally generated and/or used primarily by a source server (100S), software executing on the source server (100S), and/or a user of the source server (100S). In one or more embodiments of the invention, destination data (104D) is data that may include a copy of the source data (104S) and may include additional data about the overall system (e.g., metadata about the source data (104S), data describing the components of one or more server(s) (100), data describing a program and/or process executing on the source server (100S), etc.). Non-limiting examples of destination data (104D) include a snapshot, image, archive, or copy of the source data (104S).

In one or more embodiments of the invention, a data chunk (e.g., read data chunk(s) (110R), write data chunk(s) (110W)) is a portion of data (104) that is copied to and from a queue (106). An individual data chunk (110) has a specific size (i.e., 10 bytes, 15 kilobytes, 5 megabytes, etc.) that consumes storage space of the device on which the data chunk (110) is stored (e.g., memory and/or a non-volatile storage device). In one or more embodiments of the invention, the size of the data chunk (110) (i.e., the "data chunk size") is set by a copy manager (102) using one or more constraints and criteria. In one or more embodiments of the invention, a data chunk (110) may be sized such that the one or more network device(s) (122) are capable of transmitting the data chunk (110) without having to segment and/or divide the data chunk (110) into any smaller portion of data (104). A data chunk (110) may be created from data (104) irrespective of the structure of the underlying data (104). As a non-limiting example, the data (104) may be stored in "blocks" that divide the data (104) into uniform portions, however a data chunk (110) may be created from a portion of one block, two portions of two blocks, an entire block, an entire block and a portion of a second block, or any combination of entire and/or partial blocks.

In one or more embodiments of the invention, a queue (e.g., a read queue (106R), a write queue (106W)) is a data structure that includes none, one, or more data chunk(s) (110). The queue may exist in the memory of the server (100) and provide a temporary location for data chunks (110) to be stored before being sent to the network (120) (e.g., after being read from non-volatile storage). Data chunks (110) in a queue (106) may be handled in a first-in-first-out (FIFO) order such that the data chunk (110) that has been stored in the queue (106) the longest will be the next data chunk (110) to be sent to the network (120) (or written to the destination data (104D) for the destination server (100D)). The data chunk (110) most recently placed in a queue (106) may be considered at the "bottom" of the queue, whereas the data chunk (110) that has existed in the queue (106) the longest may be considered at the "top" of the queue.

In one or more embodiments of the invention, a queue capacity (e.g., a read queue capacity (108R), a write queue capacity (108W)) is the available space (i.e., memory) allocated to a queue (106). In one or more embodiments of the invention, the copy manager (102) may set the queue capacity (108) by allocating some region of memory for the queue (106) that allows for the writing and copy on one or more data chunk(s) (110). The queue capacity (108) may be dynamic and allow for the data chunk(s) (110) to fill whatever memory may be available on a server (100) and/or allocated to the queue capacity (108) while the copy operation is in progress. The queue capacity (108) may be fixed and allow for the data chunk(s) (110) to fill whatever memory may be allocated to the queue capacity (108) while the copy operation is in progress.

While FIG. 1 shows a specific configuration of a system, other configurations may be used without departing from the scope of the invention. Accordingly, embodiments disclosed herein should not be limited to the configuration of devices and/or components shown in FIG. 1.

Figure 2:
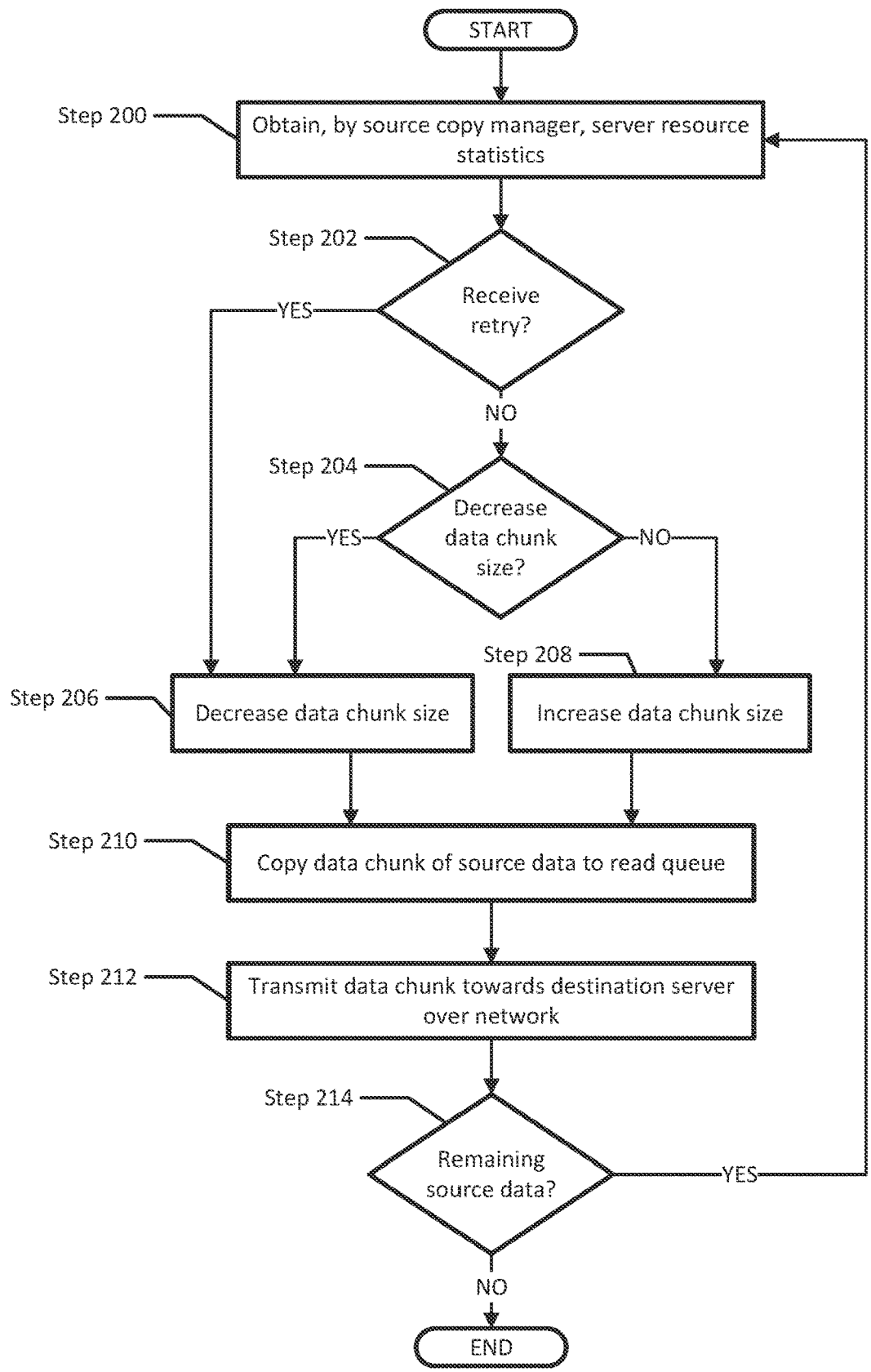
FIG. 2 shows a flowchart of a method of performing a copy operation, in accordance with one or more embodiments of the invention.

FIG. 2 shows a flowchart of a method of performing a copy operation, in accordance with one or more embodiments of the invention. All or a portion of the method shown may be performed by one or more components of the source copy manager. However, another component of the system may perform this method without departing from the invention. While the various steps in this flowchart are presented and described sequentially, one of ordinary skill in the relevant art will appreciate that some or all of the steps may be executed in different orders, may be combined or omitted, and some or all steps may be executed in parallel.

In Step 200, the source copy manager obtains resource statistics from the source server. In one or more embodiments of the invention, the resource statistics for the source server may include (i) overall CPU usage of the server, (ii) CPU usage of the server due to ongoing copy process (e.g., that of the copy manager), (iii) CPU usage of other processes executing on the server, (iv) overall memory usage of the server, (v) memory usage of the server due to the read queue, (vi) memory usage due to other processes executing on the server. Additionally, in one or more embodiments of the invention, the source copy manager may receive resource statistics from the destination server (and/or the destination copy manager executing thereon) providing the same statistics (i-vi) for the destination server.

In Step 202, the source copy manager makes a determination as to whether the source server has received a retry request from the destination server and/or a network device. In one or more embodiments of the invention, if a network device fails to transmit a data chunk and/or if the destination server (and/or one or more components thereof) is unable to properly receive, copy, write and/or otherwise handle a data chunk (sent by the source server), the network device and/or destination server may send a retry request to the source server. The retry request may include information related to the data chunk (or larger data) which failed to properly transmit to the destination server. Further, the retry request may include information related to the cause of the failure. Non-limiting examples of information related to the cause of the failure include (i) a data chunk that is too large for a network device to handle, (ii) memory overload of a network device, (iii) memory overload of the destination server, (iv) an error indicating that the data chunk is too large. If the source copy manager has received a retry request from the destination server (Step 202-YES), the process proceeds to Step 206. However, if the source copy manager has not received a retry request from the destination server (Step 202-NO), the process proceeds to Step 204.

In Step 204, the source copy manager makes a determination as to whether the chunk size of future read data chunk should be decreased. In one or more embodiments of the invention, the resource statistics (obtained in Step 200) are analyzed to determine if the data chunk size should be decreased (Step 206) or increased (Step 208).

In one or more embodiments of the invention, if:
(i) the source server memory utilization is above a threshold (e.g., 85%, 90%, etc.),
(ii) the source server CPU utilization is above a threshold (e.g., 98%, 99%, etc.),
(iii) the read queue capacity utilization is above a threshold (e.g., 80%, 85%, etc.),
(iv) the source server CPU is being throttled for concurrent user operations,
(v) the source server memory is being limited for concurrent user operations, (vi) the destination server memory utilization is above a threshold (e.g., 85%, 90%, etc.),
(vii) the destination server CPU utilization is above a threshold (e.g., 98%, 99%, etc.),
(viii) the write queue capacity utilization is above a threshold (e.g., 80%, 85%, etc.), or
(ix) any combination thereof,
the source copy manager may determine the data chunk size is to be decreased. If none of the above conditions (i-ix) are satisfied (the resources are "underutilized"), the source copy manager may determine to increase the data chunk size, as a default.

If the source copy manager determines to shrink the chunk size of future read data chunks (Step 204-YES), the process proceeds to Step 206. However, if the source copy manager determines not to shrink the chunk size of future read data chunks (Step 204-NO), the process proceeds to Step 208.

In Step 206, the source copy manager decreases the chunk size of future read data chunks copied to the read queue. The source copy manager may decrease the data chunk size by a fixed data size increment (e.g., 5 kB, 2 MB, etc.), a fixed percentage (e.g., 1%, 8%, 14%, etc.), or a variable amount dependent on the previous decrease value (e.g., a 10 kB decrease if the previous decrease was 5 kB, a 3% decrease if the previous decrease was 1%, etc.).

In Step 208, the source copy manager increases the chunk size of future read data chunks copied to the read queue. Although not shown in FIG. 2, the source copy manager may keep the data chunk size the same. That is, the source copy manager may determine (at Step 204) that a decrease in the data chunk size is not required, and the process may proceed to Step 208. However, the source copy manager may continue to use the same chunk size as the copy operation continues.

In Step 210, the source copy manager copies a data chunk of the source data to the read queue. The source copy manager will copy a data chunk that is the data chunk size determined most recently in Step 206 or Step 208. The source copy manager will add the data chunk to the "bottom" of the read queue (the data chunk to be handled after all previously added data chunks are handled). If the read queue is empty, the data chunk added to the queue will be the only data chunk in the read queue and therefore may be at the "top" and "bottom" of the queue simultaneously.

In Step 212, the source copy manager transmits the data chunk towards the destination server via an operatively attached network. The source copy manager sends the data chunk at the "top" of the queue (i.e., the data chunk that has stored in the read queue for the longest time period). After the source copy manager sends the data chunk to the network, the source copy manager may erase (e.g., delete, mark for deletion, allow to be overwritten) the data chunk from the read queue.

In Step 214, the source copy manager makes a determination as to whether there is remaining source data to be copied to the read queue. In one or more embodiments of the invention, the copy operation is for a known and/or predetermined amount of source data. As all of the source data is divided into data chunks and sent to the destination server, the source copy manager tracks the source data that has yet to be copied to the read queue and sent over the network. If there is remaining source data to be copied to the read queue (Step 214-YES), the process returns to Step 200. However, if there is no remaining source data to be copied to the read queue (Step 214-NO), the process may end.

Although FIG. 2 shows Steps 200 through 208 being performed for each data chunk, Steps 200-208 may be performed for groups of data chunks (e.g., every 5, 10, 100, etc. data chunks) and/or may be performed at time intervals (e.g., every 1 second, 5 minutes, etc.). Accordingly, for any two or more data chunks that are copied to the read queue (in Step 210), the source copy manager will use the same data chunk size as most recently determined in Steps 206-208.

Figure 3:
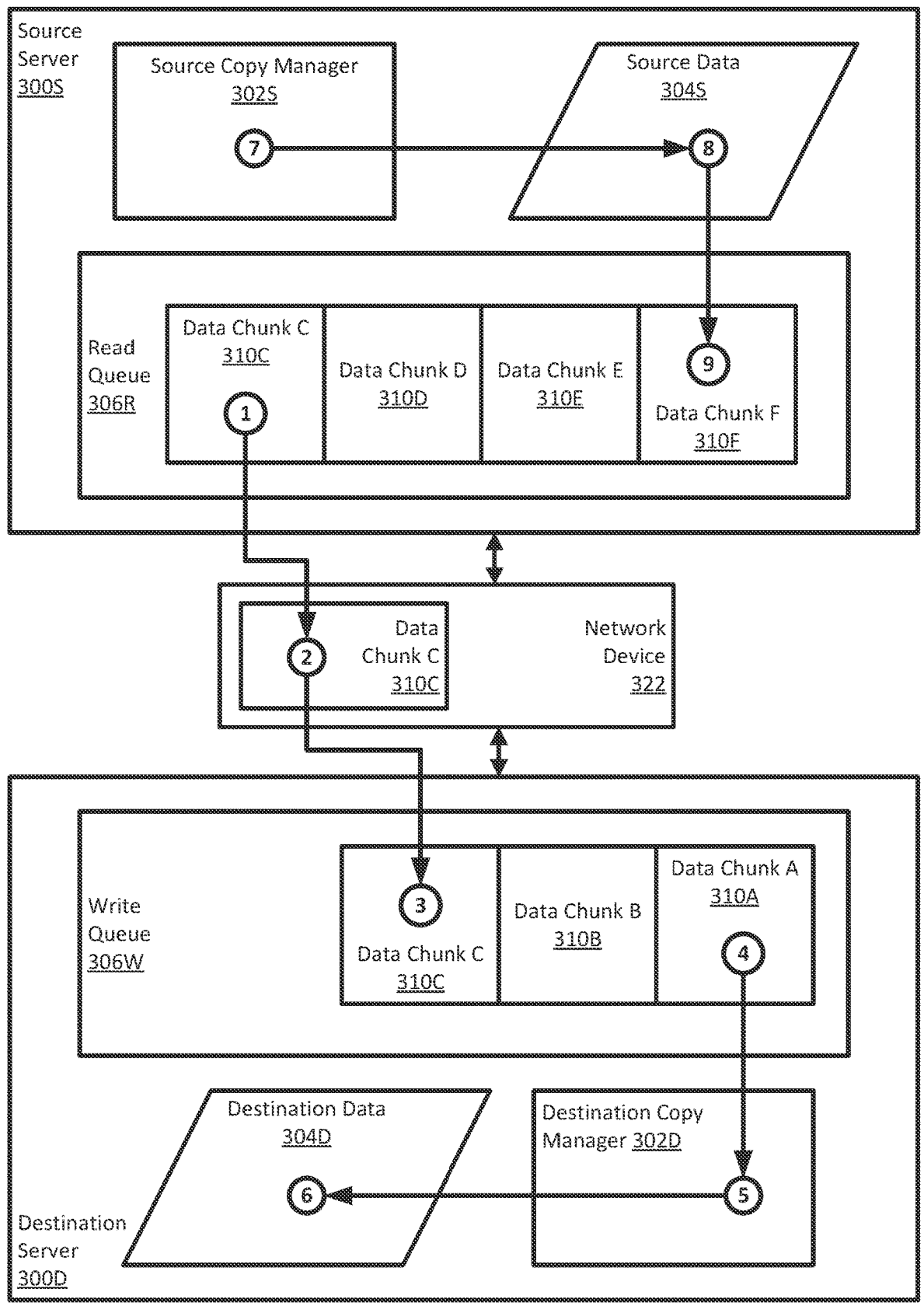
FIG. 3 shows an example, in accordance with one or more embodiments.

FIG. 3 shows an example, in accordance with one or more embodiments. The example shown in FIG. 3 includes a source server (300S), a destination server (300D), and a network device (322). The following use case is for explanatory purposes only and not intended to limit the scope to this embodiment.

Consider a scenario in which, at (1), a source copy manager (302S) sends data chunk C (310C) that is 0.8 kB, from the read queue (306R) to a network device (322). The source copy manager (302S) sends data chunk C (310C) (instead of data chunk D (310D) or data chunk E (310E)) because data chunk C (310C) is at the "top" of the queue and is therefore the next data chunk (310) to be sent (data chunk F (310F) is not in the read queue (306R) at (1)). Further, after sending data chunk C (310C) to the network device (322), the source copy manager (302S) removes data chunk C (310C) from the read queue (306R) by marking the region of memory consumed by data chunk C (310C) as free. At (2), the network device (322) sends data chunk C (310C) to the destination server (300D). At (3), the destination server (300D) receives data chunk C (310C) and the destination copy manager (302D) copies data chunk C (310C) to the "bottom" of the write queue (306W) behind data chunk A (310A) and data chunk B (310B).

At (4), (5), and (6), the destination copy manager (302D) copies the oldest data chunk (310) (i.e., data chunk A (310A)) from the "bottom" of the write queue (306W) to the destination data (304D). After data chunk A (310A) is copied from the write queue (306W) to the destination data (304D), the destination copy manager (302D) removes data chunk A (310A) from the write queue (306W) by marking the region of memory consumed by data chunk A (310A) as free.

At (7), (8), and (9), the source copy manager (302S) receives resource statistics from the source server (300S) and the destination server (300D). The source copy manager (302S) determines the source server (300S) and destination server (300D) resources are underutilized. Accordingly, the source copy manager (302S) increases the data chunk size from 0.8 kB to 1.0 kB (i.e., a 25% increase). The source copy manager (302S) then copies a new data chunk (data chunk F (310F) with a size of 1.0 kB) from the source data (304S) to the "bottom" of the read queue (306R).

While one or more embodiments have been described herein with respect to a limited number of embodiments and examples, one of ordinary skill in the art, having the benefit of this detailed description, would appreciate that other embodiments can be devised which do not depart from the scope of the embodiments disclosed herein. Accordingly, the scope should be limited only by the attached claims.

What is claimed is:

1. A method for copying source data from a source server to a destination server, comprising:
    initiating, by a source copy manager, a copy operation of the source data, wherein during the copy operation, the method further comprises:
        obtaining resource statistics at a first time to obtain first resource statistics, wherein the resource statistics comprises at least one of the following: processing usage of the source server, processing usage of the source server due to the copy operation, processing usage of the source server due to operations other than the copy operation, memory usage of the source server, memory usage of the source server due to the copy operation, and memory usage of the source server due to operations other than the copy operation;

setting a first data chunk size based on the first resource statistics;

copying a first data chunk to a read queue, wherein the first data chunk comprises a portion of the source data, and wherein the first data chunk has the first data chunk size;

sending, from the read queue, the first data chunk to a network device; and after sending:
  obtaining the resource statistics at a second time to obtain second resource statistics;
  setting a second data chunk size different than the first data chunk size and based on the second resource statistics;
  copying a second data chunk to the read queue, wherein the second data chunk comprises a second portion of the source data, and wherein the second data chunk has the second data chunk size; and
  sending, from the read queue, the second data chunk to the network device.

2. The method of claim 1, wherein setting the first data chunk size based on the first resource statistics, comprises:
  analyzing the first resource statistics;
  making a first determination, based on the first resource statistics, that resources of the source server are underutilized; and
  in response to the first determination:
    setting the first data chunk size to be larger than a previous data chunk size.

3. The method of claim 1, wherein setting the second data chunk size based on the second resource statistics, comprises:
  analyzing the second resource statistics;
  making a second determination, based on the second resource statistics, that the resources of the source server are underutilized; and
  in response to the second determination:
    setting the second data chunk size to be larger than the first data chunk size.

4. The method of claim 1, wherein setting the first data chunk size based on the first resource statistics, comprises:
  analyzing the first resource statistics;
  making a first determination, based on the first resource statistics, that a resource of the source server is utilized above a threshold; and
  in response to the first determination:
    setting the first data chunk size to be smaller than a previous data chunk size.

5. The method of claim 4, wherein the resource of the source server is being utilized by a concurrent user operation executing on the source server.

6. The method of claim 1, wherein prior to setting the first data chunk size, the source server receives a retry request, and wherein setting the first data chunk size comprises setting the first data chunk size to be smaller than a previous data chunk size.

7. A non-transitory computer readable medium comprising instructions which, when executed by a computer processor, enables the computer processor to perform a method for copying source data from a source server to a destination server, comprising:
  initiating, by a source copy manager, a copy operation of the source data, wherein during the copy operation, the method further comprises:
    obtaining resource statistics at a first time to obtain first resource statistics, wherein the resource statistics comprises at least one of the following: processing usage of the source server, processing usage of the source server due to the copy operation, processing usage of the source server due to operations other than the copy operation, memory usage of the source server, memory usage of the source server due to the copy operation, and memory usage of the source server due to operations other than the copy operation;
    setting a first data chunk size based on the first resource statistics;
    copying a first data chunk to a read queue, wherein the first data chunk comprises a portion of the source data, and wherein the first data chunk has the first data chunk size;
    sending, from the read queue, the first data chunk to a network device; and
    after sending:
      obtaining the resource statistics at a second time to obtain second resource statistics;
      setting a second data chunk size different than the first data chunk size and based on the second resource statistics;
      copying a second data chunk to the read queue, wherein the second data chunk comprises a second portion of the source data, and wherein the second data chunk has the second data chunk size; and
      sending, from the read queue, the second data chunk to the network device.

8. The non-transitory computer readable medium of claim 7, wherein setting the first data chunk size based on the first resource statistics, comprises:
  analyzing the first resource statistics;
  making a first determination, based on the first resource statistics, that resources of the source server are underutilized; and
  in response to the first determination:
    setting the first data chunk size to be larger than a previous data chunk size.

9. The non-transitory computer readable medium of claim 7, wherein setting the second data chunk size based on the second resource statistics, comprises:
  analyzing the second resource statistics;
  making a second determination, based on the second resource statistics, that the resources of the source server are underutilized; and
  in response to the second determination:
    setting the second data chunk size to be larger than the first data chunk size.

10. The non-transitory computer readable medium of claim 7, wherein setting the first data chunk size based on the first resource statistics, comprises:
  analyzing the first resource statistics;
  making a first determination, based on the first resource statistics, that a resource of the source server is utilized above a threshold; and
  in response to the first determination:
    setting the first data chunk size to be smaller than a previous data chunk size.

11. The non-transitory computer readable medium of claim 10, wherein the resource of the source server is being utilized by a concurrent user operation executing on the source server.

12. The non-transitory computer readable medium of claim 7, wherein prior to setting the first data chunk size, the source server receives a retry request, and wherein setting the first data chunk size comprises setting the first data chunk size to be smaller than a previous data chunk size.

13. A source server, comprising:
memory comprising a read queue;
a storage device comprising source data; and
a processor executing a source copy manager, wherein the processor is configured to perform a method for copying the source data from to a destination server, comprising:
initiating, by the source copy manager, a copy operation of the source data, wherein during the copy operation, the method further comprises:
obtaining resource statistics at a first time to obtain first resource statistics, wherein the resource statistics comprises at least one of the following: processor usage of the source server, processor usage of the source server due to the copy operation, processor usage of the source server due to operations other than the copy operation, memory usage of the source server, memory usage of the source server due to the copy operation, and memory usage of the source server due to operations other than the copy operation;
setting a first data chunk size based on the first resource statistics;
copying a first data chunk to a read queue, wherein the first data chunk comprises a portion of the source data, and wherein the first data chunk has the first data chunk size;
sending, from the read queue, the first data chunk to a network device; and
after sending:
obtaining the resource statistics at a second time to obtain second resource statistics;
setting a second data chunk size different than the first data chunk size and based on the second resource statistics;
copying a second data chunk to the read queue, wherein the second data chunk comprises a second portion of the source data, and wherein the second data chunk has the second data chunk size; and
sending, from the read queue, the second data chunk to the network device.

14. The source server of claim 13, wherein setting the first data chunk size based on the first resource statistics, comprises:
analyzing the first resource statistics;
making a first determination, based on the first resource statistics, that resources of the source server are underutilized; and
in response to the first determination:
setting the first data chunk size to be larger than a previous data chunk size.

15. The source server of claim 13, wherein setting the second data chunk size based on the second resource statistics, comprises:
analyzing the second resource statistics;
making a second determination, based on the second resource statistics, that the resources of the source server are underutilized; and
in response to the second determination:
setting the second data chunk size to be larger than the first data chunk size.

16. The source server of claim 13, wherein setting the first data chunk size based on the first resource statistics, comprises:
analyzing first the resource statistics;
making a first determination, based on the first resource statistics, that a resource of the source server is utilized above a threshold; and
in response to the first determination:
setting the first data chunk size to be smaller than a previous data chunk size.

17. The source server of claim 16, wherein the resource of the source server is being utilized by a concurrent user operation executing on the source server.

* * * * *